UNITED STATES PATENT OFFICE.

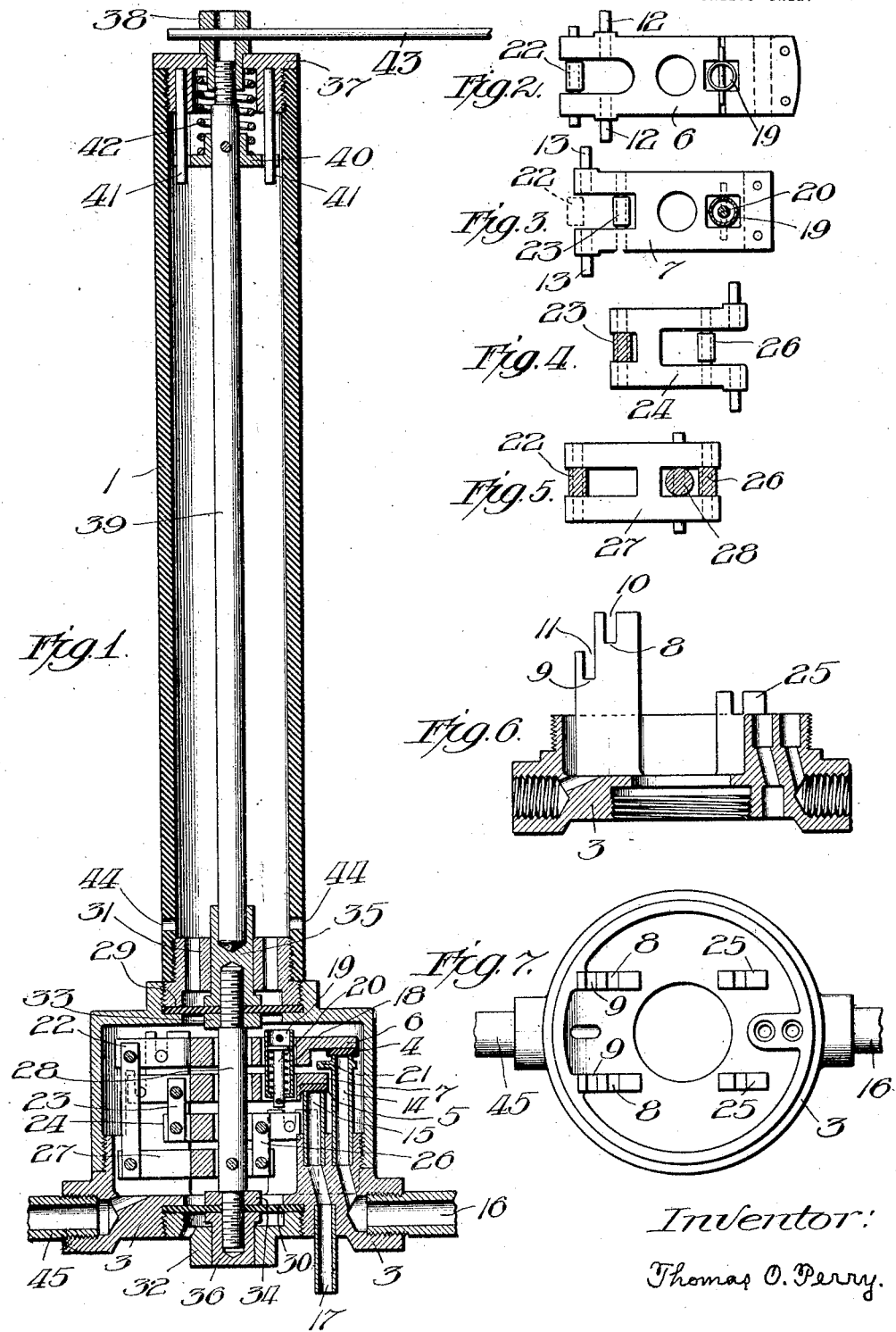
T. O. PERRY.
HEAT REGULATOR.
APPLICATION FILED OCT. 31, 1918.
1,378,556.
Patented May 17, 1921.
2 SHEETS—SHEET 1.
Inventor:
Thomas O. Perry.

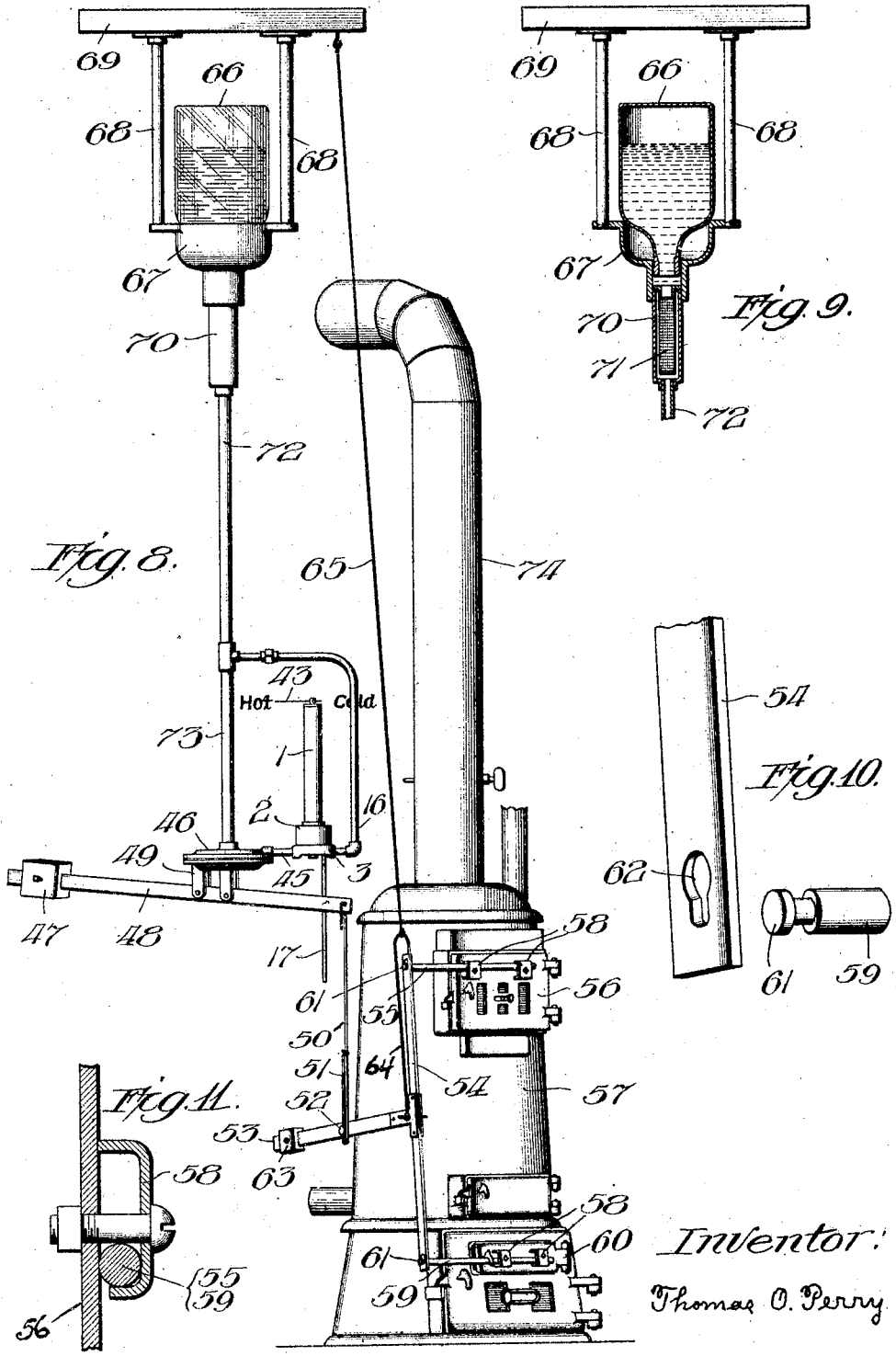

THOMAS O. PERRY, OF OAK PARK, ILLINOIS.

HEAT-REGULATOR.

1,378,556.    Specification of Letters Patent.    Patented May 17, 1921.

Application filed October 31, 1918. Serial No. 260,542.

*To all whom it may concern:*

Be it known that I, THOMAS O. PERRY, a citizen of the United States, residing at Oak Park, in the county of Cook and State of Illinois, have invented a new and useful Heat-Regulator, of which the following is a specification.

My invention relates to improvements in heat regulators in which the regulating dampers of a heater are operated by a fluid-pressure motor to which fluid under pressure is admitted and from which said fluid is released through thermostatic valves controlled by a sensitive element whose expansion and contraction is caused by changes in atmospheric temperature or otherwise; and the objects of my improvements are, first, to provide a closed housing for the thermostatic valves through which pressure fluid may pass to and from the motor without necessarily affecting the thermostatic action of the sensitive element either by the temperature or by the pressure of the pressure fluid; second, to provide operative connection between the inclosed thermostatic valves and the thermostatic sensitive element located exteriorly which shall be as free as possible from frictional interference and practically proof against leakage of pressure fluid; third, to provide a convenient, simple and effective arrangement of the inlet and outlet thermostatic valves; and fourth, to provide an improved method of connection between the dampers of a heater and the motor whereby both may be closed, but one must be closed to occasion the opening of the other.

I attain these objects by the mechanism illustrated in the accompanying drawing, in which—

Figure 1 is a full size vertical section of the thermostat including the sensitive thermostatic element, the inclosing valve chamber and the inclosed inlet and outlet valves and their connections; Fig. 2, a plan of the inlet valve and lever; Fig. 3, a plan of the outlet valve and lever; Fig. 4, a plan of the auxiliary valve lever; Fig. 5, a plan of the equalizing valve yoke; Fig. 6, a sectional elevation of the chamber base showing the fulcrums which support the valve levers; Fig. 7, a plan of the chamber base; Fig. 8, an elevation of the whole heating apparatus on a reduced scale; Fig. 9, a vertical section of the fluid pressure receptacle and connections; Fig. 10, an enlarged view of the lower end of the damper lever and end of damper rod detached; and Fig. 11, an enlarged sectional elevation of one of the damper clips showing how the damper rod is secured to the damper.

Similar numerals refer to similar parts throughout the several views.

The thermostat shown in Fig. 1 is an improvement on that shown on U. S. Patent No. 726,985 issued to myself May 5, 1903. The sensitive element 1, is a cylindrical tube preferably made of hard rubber whose changes in length are supposed to be effected either by direct heat radiation or by changes in atmospheric temperature of the locality where it is placed, and is here shown externally attached to the cover of the valve chamber 2, by screw threads. The valve chamber base 3, screws into the cover 2, and forms therewith an inclosure for the fluid pressure valves 4 and 5 which terminate the ends of valve levers 6 and 7 whose fulcrums 8 and 9 project upward from the valve chamber base as shown in Figs. 6 and 7. The fulcrums all have notches 10 and 11 opening upward to receive the valve trunnions 12 and 13. The valves 4 and 5 are adapted to cover nozzles 14 and 15 opening upward in proximity to each other and attached to the chamber base through which they communicate with the pressure fluid inlet pipe 16, and pressure fluid outlet 17. A valve spring 18 reacts between the two superposed valve levers 6 and 7 tending to close one and open the other. The spring presses down against the head of the cage 19 which hangs by a pivot from the upper valve lever and thrusts upward against the flange on the central rod 20 which connects pivotally with the lower lever. The opening of the lower valve 5, is limited by a shoulder 21, on the inlet nozzle 14 which prevents direct contact between the two levers due to the tension of the spring. An inlet link 22, depends from the inlet lever by pivotal connection on the opposite side of the fulcrum from the valve. An outlet link 23 depends from the outlet lever by pivotal connection on the same side of the fulcrum as the corresponding valve. The lower end of the outlet link has pivotal connection with one end of an auxiliary lever 24, whose other end is fulcrumed in open notches on the auxiliary fulcrum posts 25, which project up from the chamber base 3. An auxiliary link 26 depends by pivotal connection from an intermediate point on the auxiliary lever located on the opposite side of the central axis of the valve chamber from the inlet link 22. The lower ends of links 22 and 26 support by pivotal connection opposite ends of an equalizing yoke 27 which has intermediate pivotal connection with a vertical tie post 28, centrally located with reference to the valve chamber and piercing without contact the superposed levers 6 and 7 and 24. The tie post extends from top to bottom of the closed valve chamber and ties together the centers of opposite upper and lower flexible disks or diaphragms, 29 and 30 which form portions of the upper and lower walls of the closed valve chamber. The peripheries of these flexible disks are clamped to their respective walls by upper and lower threaded clamping nuts, 31 and 32. The centers of the flexible disks are clamped between washers, 33 and 34, shouldered against the tie rod, and upper and lower tie nuts, 35 and 36, which screw on to opposite reduced ends of the tie rod. These tie nuts have extensions which loosely protrude into and are guided by central openings in the clamping nuts. A reduced portion of the upper clamping nut screws into and supports the sensitive element, 1, above the closed valve chamber. The upper end of the sensitive element has a cap 37, screwed into it which supports an adjusting nut 38, having a shoulder resting upon the upper surface of the cap and a reduced cylindrical neck protruding loosely into the cap and which is threaded to receive the reduced threaded end of a thrust rod 39. A flanged thrust collar 40 is pinned to the thrust rod a short distance below the adjusting nut and is held against axial rotation by guide rods 41, which extend downward from the cap 37, and engage opposite peripheral notches in the flange of the thrust collar. A helical thrust spring 42, is compressed between the collar flange and the cap which partially incloses the spring. The lower end of the thrust rod loosely enters a socket in the top of the upper tie nut 35, and is adapted to thrust against the bottom of the socket. A long pointer 43, protruding from the adjusting nut above the cap facilities gaging adjustments. Vents 44, near the lower end of the tubular sensitive element serve for detection of accidental leakage of pressure fluid into the interior of the tube.

The open notched fulcrums are adapted to resist displacement of the lever trunnions downward, but not upward. This is a matter of convenience in assembling the various parts, enabling the valve levers and other connected levers and links to be let in or lifted out when all are connected together. The valve lever trunnions naturally rest in the notches by gravitational action and are also thrust downward when the thermostatic tube contracts. When the tube expands, the thrust rod 39 withdraws somewhat from the socket in the tie nut 35 allowing the valve 4 to close by gravitation. The weight of both valve levers 6 and 7 acts to close the valve 4 by reason of the spring 18 holding the valve 5 open whenever the downward thrust of the rod 39 is relaxed. The spring 42 prevents lost motion by holding the adjusting nut 38 against the cap 37 and can yield to prevent injury if the contraction of the thermal tube should chance to become excessive in very cold weather when not in normal use.

The motor pipe 45, furnishes free passage for pressure fluid between the closed valve chamber and the diaphragm motor 46, of ordinary construction, which receives fluid pressure in this case to force the diaphragm downward lifting at the same time the counterweight 47, which reacts against the under side of the diaphragm to discharge pressure fluid when the outlet valve 5, opens. The motor lever 48, which carries the counterweight at one end, is fulcrumed between lugs 49 projecting downward from the periphery of the motor casing and at the other end suspends a damper link 50, which terminates below in an elongated loop 51, which engages and is free to slide on a button 52, attached to the side of a lateral arm 53, projecting from the side of a damper yoke 54, at a point intermediate between its ends. The upper end of the damper yoke is detachably connected to the end of a damper rod 55, clamped to the check damper 56, which in this case is the feed door of an ordinary coal heater 57, by clamps 58. An enlarged sectional view of one of the clamps is shown in Fig. 11. In the same way the lower end of the damper yoke is connected with the end of a damper rod 59 clamped to the draft 60 damper, here shown in the form of a door. An enlarged view of the lower end of the damper yoke and the detachable end of the damper rod are shown in Fig. 10. The damper rods terminate in knobs 61 which hook loosely into elongated eyes 62, enlarged above so that the rods may be unhooked by slightly lifting them by hand. A small weight 63, on the lateral arm 53, helps to keep the button 52 pressed against the lower end of the loop 51. The damper yoke is held up against the damper rods, thus lifting both dampers, or doors, enough to unlatch them, by a long supporting clevis 64 which pivotally connects at its lower end with the lateral arm 53 close to its attachment with the yoke. An inclined wire link 65 suspended from the ceiling or other convenient support holds up the clevis and, by reason of its inclination, tends to hold both dampers closed by elastic pressure.

The damper yoke 54 and lateral arm 53 together constitute the damper lever and, as a whole, is rotated by the motor through a small angular movement in either direction about either pivotal connection with the dampers. When the draft door closes, the adjacent pivotal connection acts as a fulcrum about which the lever turns while opening the feed door; and likewise, after the feed door closes, the upper pivoted connection acts as a fulcrum for opening the lower door. Thus, one damper must close before a fixed fulcrum is established on which the lever can act for opening the other damper. One of the dampers should be self-closing either through gravitational action or by other means. It is not essential that both dampers shall tend to close independently of thermostatic influence.

The pressure fluid which enters the valve chamber through the inlet pipe 16, may be either a gas, as compressed air, or a liquid derived from any convenient source of supply. As illustrated, water is used as a source of fluid pressure and is contained in an inverted glass bottle 66 placed at some distance above the thermostat and diaphragm motor in any convenient location. The inverted neck of the water bottle is shown projecting into a funnel 67, on whose open rim the bottle rests. Suspension rods 68 have flanges at their upper ends secured to a ceiling, or to a board 69 attached to a ceiling, and at their lower ends screw into ears on opposite sides of the funnel. The funnel terminates below in a reduced neck which receives loosely the neck of the inverted water bottle and has screwed into it a nipple 70 of sufficient size to inclose a strainer 71 having a flange at its upper end which rests on the upper end of the nipple. A feed pipe 72 leads from the nipple downward and communicates with the inlet pipe 16 which supplies fluid pressure to the closed valve chamber 2 whenever the inlet valve 4 opens. The pipe 73 forms a convenient connection for suspension of the diaphragm motor but is closed against the passage of pressure fluid. The words Hot and Cold are supposed to be marked on a wall at some distance from the adjusting nut of the thermostat as guides for setting the pointer 43. The outlet pipe 17 may lead to any place where waste water can be discharged, or the escaping water may be caught in a small dish set on the floor beneath the outlet, and emptied as required.

The installation illustrated in Fig. 8 represents the preferred arrangement where the fuel burned in the heater is coal of the softer varieties having a large percentage of volatile matter, and the operation is as follows: What I have called the check damper in this case is also the feed door for fuel which with the draft door below the grate are together called the check and draft dampers and are the only ones controlled by the thermostat. The sensitive element 1, is preferably located near the base of the smoke flue 74, where it will most quickly respond to atmospheric changes of temperature as well as to direct radiation from the heater. This is because a soft coal fire, after starting to blaze, needs to be checked very soon, and at the same time have a plentiful supply of air immediately above the fuel. If the thermostat should be placed too far from the heater, and especially if placed in a distant or separate apartment, the change in temperature affecting the thermostat would not act in time to make checking effective before the fuel is too far consumed.

Contraction of the sensitive thermostatic element, acting through the thrust rod and various connecting links and levers opens the inlet valve 4, after the outlet valve 5 has been securely closed, letting pressure fluid act on the diaphragm motor as required to close the check damper, or feed, door. Further action of the motor in the same direction opens the draft damper, though this draft damper does not necessarily open and may be held closed or allowed to open but slightly, as desired. This disposition of the dampers favors quick acceleration of combustion, accompanied with considerable flame, which in a very few minutes generally causes the sensitive element to expand, allowing the inlet valve 4 to first close against admission of pressure fluid, and letting the outlet valve 5 subsequently open through the action of the valve spring 18. After these reverse movements of the fluid pressure valves occur, the counterweight 47 acts to discharge pressure fluid from the motor and open the check damper, after first closing the draft damper, if the latter has previously opened. If the closing of the draft damper, previously open, sufficiently checks the fire, the checking action of the counterweight may be arrested without the subsequent opening of the check damper, as frequently happens after volatile matter in the fuel has been consumed.

The quick checking of the fire after fresh fuel has burst into flame makes it unnecessary to open the check damper more than is required for supplying sufficient air above the fuel for proper combustion of the volatile matter. The amount of check opening needed must be determined by heater characteristics and individual experience.

The relationship between the long and short arms of the equalizing yoke 27, the auxiliary lever 24, and the valve levers 6 and 7, is such that the tie post 28 moves but slightly in effecting a very considerable opening or closing of the valves 4 and 5.

The consequent slight flexing of the diaphragms 29 and 30 therefore offers very little resistance to actuation by the sensitive element through the thrust rod 39. The upper diaphragm effectually prevents pressure fluid coming in contact with the sensitive element, which otherwise might be influenced adversely by pressure fluid temperature. The lower diaphragm receives fluid pressure which counterbalances pressure against the upper diaphragm, which would otherwise either hinder or augment the proper action of the sensitive element. If the upper diaphragm alone were connected with the tie post, the opening of the inlet and outlet valves 4 and 5 would be arrested and retarded by fluid pressure variation immediately after admission or discharge commenced. If, however, the functions of the valves 4 and 5 were reversed, as they might be, with corresponding changes made in the damper connections with the motor, the opening of these fluid pressure valves would be abruptly hastened after opening was initiated by the sensitive element. Such retardations and accelerations of valve opening might be useful in some installations of special character, and, when both diaphragms connect with the tie rod, different degrees of retardation or acceleration of valve movement could be realized by the simple expedient of making one diaphragm smaller or larger than the other. We have shown both diaphragms of equal size, as required for most sensitive action of the thermostat.

If the pressure fluid valve 5 is made the inlet, and valve 4 is made the outlet, the interacting valve spring 18 could be dispensed with, as, in that case, the fluid pressure could open the valve 5 without the assistance of a spring or counterweight. In any case, the fire is checked when the valve 5 opens, and if the functions of these valves are reversed, there would be failure to check the fire if the supply of pressure fluid should become exhausted from neglect or any cause. Making valve 4 the inlet, as specified, insures checking of the fire whether fluid pressure always is maintained or not, and is therefore preferred.

When the tension of the thrust rod is relaxed by expansion of the sensitive element, the valve spring not only opens the lower valve but causes the weight of the lower valve lever to assist that of the upper valve lever in holding the upper valve tightly closed, and may still more tightly close the upper valve if the tension of the spring more than suffices to lift the lower valve against the closing effect of fluid pressure. Excessive tension of the valve spring would necessitate increased pressure of the thrust rod to close the lower valve, but, nevertheless, the closing of the lower valve would occasion the opening of the upper valve without appreciative change of interval between the closing of one valve and the consequent opening of the other, because the excess of thrust on the equalizing yoke, acting through the inlet link 22, counteracts with corresponding increase of force to open the upper valve. For this reason the tension of the interacting valve spring does not need to be so nicely adjusted as would be the case if the lower valve was opened by a spring which did not react to close the upper valve. Variations in the tension of the interacting spring, as arranged, can only affect the setting of the adjusting nut 38 to give the thrust rod more or less tension additional to changes in thrust due to changes in temperature.

As shown, the thermostat is affected partly by temperature of the atmosphere around the sensitive element, and partly by direct heat radiation. If the thermostat is located farther away from the heater, direct radiation will have less effect, and weather conditions will have relatively greater influence. Therefore, if the heater is used for warming the rooms of a building, the thermostat should be located farther from the heater than I have shown it, especially if the fuel used is devoid of volatile matter. The location near the heater is best for effective control of the fire and economical consumption of coal, whether soft or hard.

I claim:

1. In a heat regulator, the combination with a motor whose actuations are thermostatically controlled, of two self-closing draft and check dampers, a damper yoke extending between said dampers having pivotal connection at either end with each damper and operative connection between said motor and said damper yoke for imparting angular movements to said yoke about either pivotal damper connection, whereby either damper may be opened while the other damper remains closed and neither damper can open before the other damper closes through actuation of the motor, substantially as herein set forth.

2. In a heat regulator, the combination with a heater having a regulating damper and a fluid pressure motor adapted to actuate said damper, of a sensitive element whose expansion and contraction is caused partly by changes in atmospheric temperature, a closed valve chamber through which fluid pressure is admitted to and released from said motor, said chamber having opposite flexible walls, inlet and outlet fluid pressure valves inclosed within said chamber, operative interior connections between both of said flexible walls and said valves whereby fluid pressures against the two walls neutralize each other and means whereby said walls are flexed by expansion and contraction of said sensitive element through connection from without said chamber, substantially as herein set forth.

3. In a heat regulator, the combination with a heater having a regulating damper and a fluid pressure motor adapted to actuate said damper, of a sensitive element whose expansion and contraction is caused by changes in temperature, a closed valve chamber through which fluid pressure is admitted to and released from said motor, inlet and outlet fluid pressure valves inclosed within said chamber, an interposed valve spring whose tension directly interacts to hold one of said valves closed while it opens the other and means whereby the tension of said sensitive element is divided proportionately between simultaneous efforts to close one and open the other of said valves, substantially as herein set forth.

4. In a heat regulator, the combination with a heater having a regulating damper and a fluid pressure motor adapted to actuate said damper, of a valve chamber through which fluid pressure is admitted to and released from said motor, said chamber having opposite flexible walls, a tie post connecting said flexible walls, inlet and outlet valves for said pressure fluid within said chamber operatively connected with said tie post, a sensitive element outside of said chamber whose expansion and contraction is caused by changes of temperature and means whereby said external sensitive element actuates said inclosed valves, substantially as herein set forth.

5. In a heat regulator, the combination with a heater having a regulating damper and a fluid pressure motor for operating said damper, of a valve chamber through which fluid pressure is admitted to and released from said motor, said chamber having opposite flexible walls, an open duct leading from said chamber to said motor, an inlet valve inclosed within said chamber to admit pressure fluid to said motor, an outlet valve also inclosed within said chamber through which pressure fluid may be allowed to escape from said motor, a tie post operatively connected with said flexible walls and with said valves, a sensitive element outside of chamber whose expansion and contraction is caused by changes in temperature and means whereby said external sensitive element actuates said inclosed valves, substantially as herein set forth.

6. In a heat regulator, the combination with a heater having a regulating damper and a fluid pressure motor for operating said damper, of a valve chamber having opposite walls or parts thereof made somewhat flexible, a tie rod connecting said flexible walls, inlet and outlet valves inclosed within said chamber for admitting and releasing pressure fluid to and from said motor, actuating connections between said tie rod and said valves, a sensitive element exterior to said chamber whose expansion and contraction is partly caused by changes in atmospheric temperature and means whereby expansion and contraction of said exterior sensitive element actuates said inclosed valves through their connections with said tie rod, substantially as herein set forth.

7. In a heat regulator, the combination with a heater having a regulating damper and a fluid pressure motor for operating said damper, of a valve chamber through which fluid pressure is admitted to and released from said motor, inlet and outlet fluid pressure nozzles paralleling each other and both opening in like direction within said chamber, inlet and outlet valves for closing and opening said nozzles, an inlet lever fulcrumed between extremities carrying the inlet valve at one end, an inlet actuating link connecting with the other end of the inlet lever, an outlet lever fulcrumed at one end and carrying the outlet valve at the other end, an outlet actuating link connecting with said inlet lever between extremities, an auxiliary outlet lever fulcrumed at one end and connecting at the other end with said outlet link, an auxiliary link connecting with said auxiliary lever between extremities, a yoke whose opposite ends connect respectively with said auxiliary link and with said inlet actuating link, a sensitive element whose expansion and contraction is partly caused by changes in atmospheric temperature and means whereby the expansion and contraction of said sensitive element opens and closes said valves through connection with said yoke at a point intermediate between its ends, substantially as herein set forth.

8. In a heat regulator, the combination with a motor whose actuations are thermostatically controlled, of a draft damper and a check damper superposed one over the other, a damper yoke pivotally connected with each of said dampers, pivotal support for said yoke which permits lateral displacement, an inclined link by which said pivotal support is suspended from above tending to hold both of said dampers closed and operative connection between said motor and said damper yoke for imparting to the yoke angular movements about either damper connection as a pivot, whereby either damper may be opened by motor actuation only while the other damper remains closed, substantially as herein set forth.

9. In a heat regulator, the combination with a motor whose actuations are thermostatically controlled, of a draft damper and a check damper superposed one over the other, a damper yoke pivotally connected with each of said dampers, pivotal support for said yoke which permits of lateral displacement, an inclined link by which said pivotal support is suspended from above tending to hold both of said dampers closed, a lateral arm projecting from the side of said yoke and operative connection between said arm and said motor for imparting angular movements to said yoke about either damper connection as a pivot, whereby motor actuations may cause either damper to open only after the other damper has been closed, substantially as herein set forth.

10. In a heat regulator, the combination with a motor whose actuations are thermostatically controlled, of two dampers one of which is self-closing, a damper yoke extending between said dampers with pivotal connection at either end with each damper, a lateral arm extending from the side of said yoke and operative connection between said arm and said motor, whereby angular movement imparted by said motor to said yoke about either pivotal connection may open or close the other damper, substantially as herein set forth.

THOMAS O. PERRY.